Oct. 14, 1930. J. A. BIRDSONG ET AL 1,778,141
COMBINATION VEGETABLE COOLER AND DISPLAY STAND
Filed April 22, 1929 2 Sheets-Sheet 1
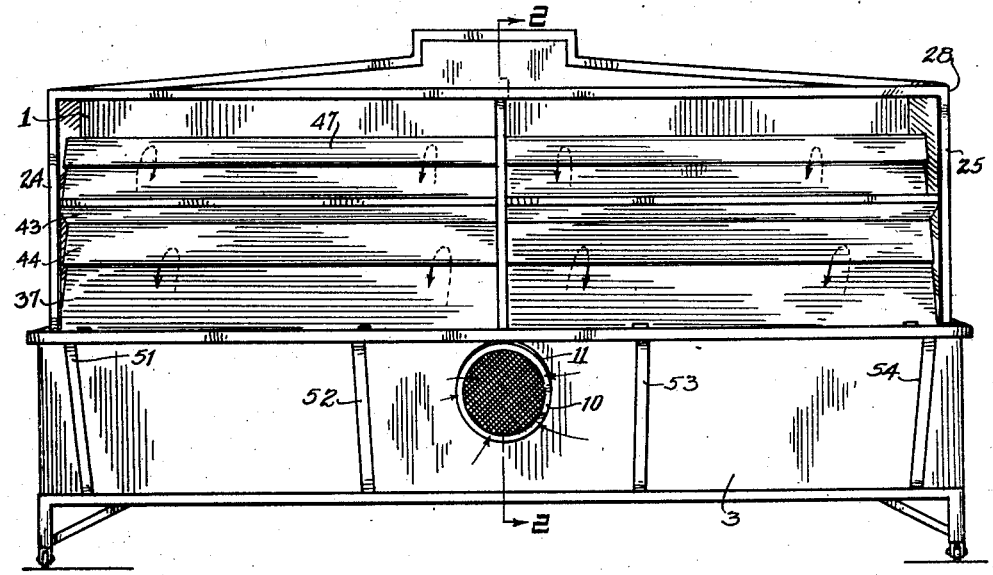
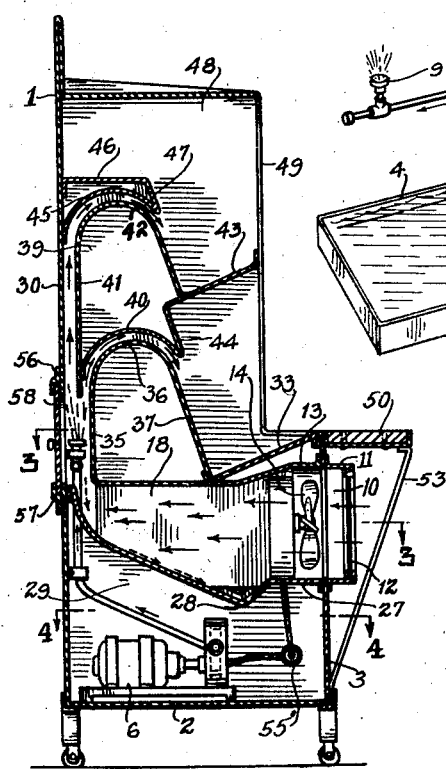
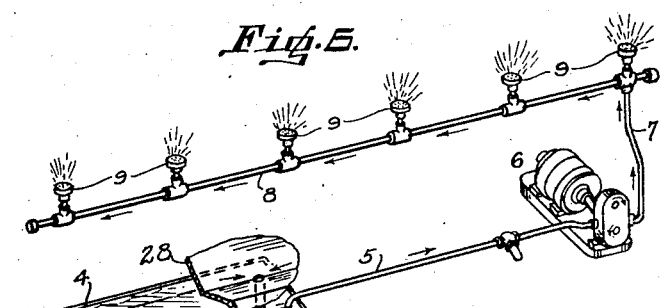
Inventors
James A. Birdsong
and Jess L. Showers
By Mason Fenwick & Lawrence
Attorneys

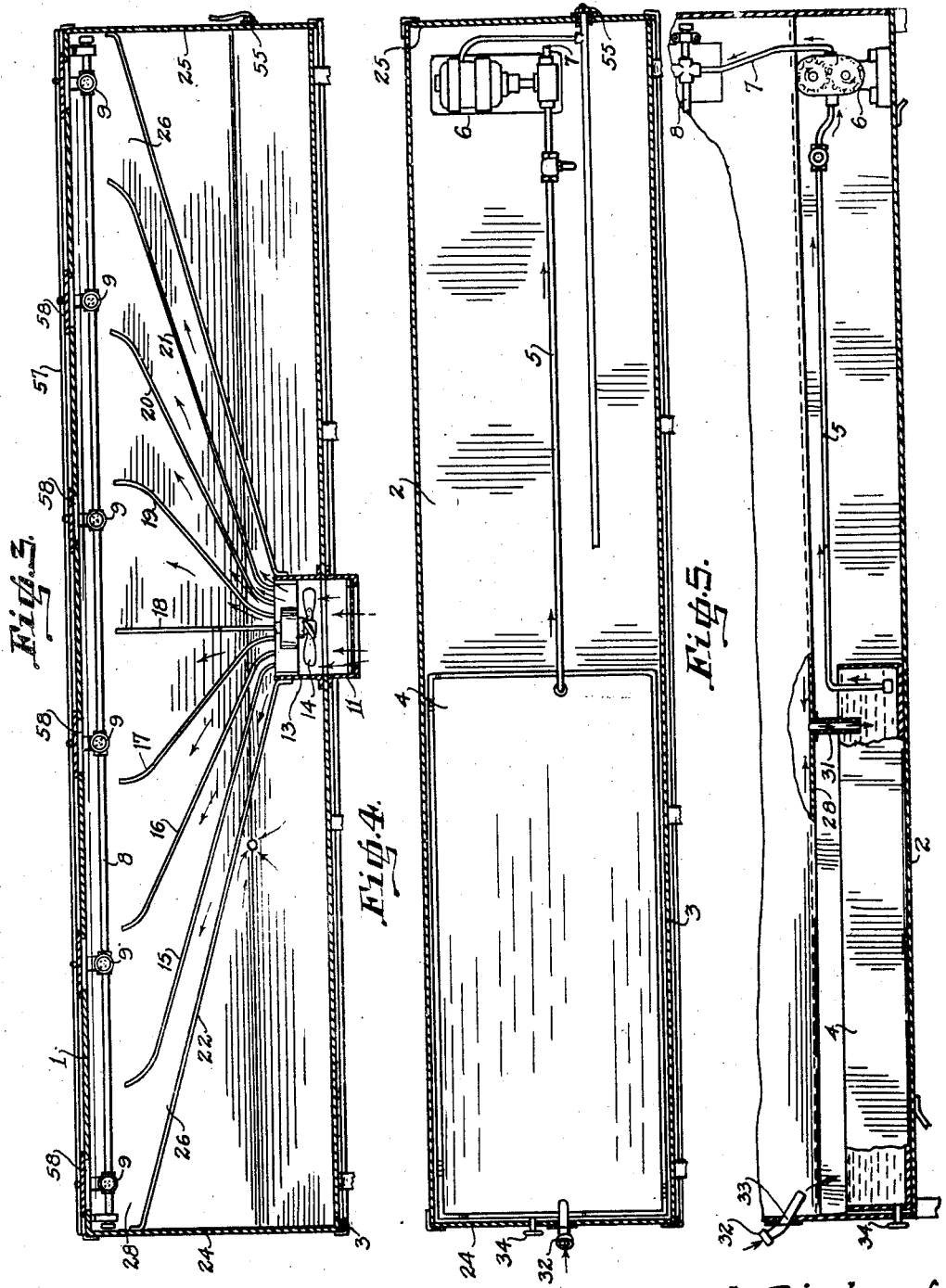

Patented Oct. 14, 1930

1,778,141

UNITED STATES PATENT OFFICE

JAMES A. BIRDSONG AND JESS L. SHOWERS, OF VERNON, TEXAS

COMBINATION VEGETABLE COOLER AND DISPLAY STAND

Application filed April 22, 1929. Serial No. 357,203.

This application is a continuation-in-part of our application, Serial No. 288,276, filed June 25, 1928, and which matured into Patent No. 1,717,181 on July 11, 1929.

The present invention is an improvement on the invention disclosed in my said application, and is especially designed for use as a cooling and display stand for vegetables and similar foodstuffs.

An object of this invention is to provide a cooling and display structure for vegetables and similar foodstuffs which must be kept in a moist condition in order to preserve them for a reasonable length of time while they are on display in stores for the purpose of effecting their sale.

A further object of the invention is to provide a cooler display stand which may be conveniently used in connection with self-serving stores, or the like, for the purpose of displaying foodstuffs for sale, which must ordinarily be kept moist while so displayed, without necessitating the services of an attendant to maintain such displayed vegetables in their proper moist condition.

Another object of the invention is to provide a stand of this type, in which the water used for moistening the vegetables, or the air circulated thereover, is used over and over again in order to avoid unnecessary expense and waste involved in spraying the foodstuffs or the air moistened for circulation around such foodstuffs.

Other objects of the invention will become apparent as the detailed description thereof proceeds.

In the drawings:

Fig. 1 is a front elevation of the vegetable display stand embodying this invention;

Fig. 2 is a central vertical section taken on the line 2—2 of Fig. 1;

Fig. 3 is a horizontal section taken on the line 3—3 of Fig. 2;

Fig. 4 is a horizontal section taken on the line 4—4 of Fig. 2;

Fig. 5 is a fragmentary elevation of the circulating system used in this display stand, parts being broken away and sectioned to illustrate operative details of the invention;

Fig. 6 is a fragmentary perspective of the spraying mechanism forming part of this invention; and Fig. 7 is a side elevation of one of the series of baffle plates for directing air through this stand across a screen of water formed by the spraying mechanism shown in Fig. 6.

Referring to the drawings, the invention comprises a casing or receptacle having a back 1, a bottom 2 and a front 3, preferably formed of sheet metal or any similar desired material. The casing as a whole, may be mounted on casters to adapt the device for ready movement from one part of the store to another.

The bottom of the casing supports a tank 4, which is connected by a pipe 5 to a circulating pump 6, from one end of which a pipe 7 extends and is connected with a manifold 8, provided with a plurality of spraying nozzles 9. The manifold 8 carrying the spraying nozzles 9 is supported at the back of the casing and directly in the path of air drawn through an opening 10 in the front wall 3 of the casing.

The opening 10 is defined by a cylindrical casing 11, fixed to the front wall 3 and provided with a filter screen 12. In alinement with the casing 11 and on the inside of the wall 3 is a similar casing 13, in which is mounted a fan 14, adapted to direct the air into the spaces between the baffle plates 15, 16, 17, 18, 19, 20, and 21, which are suitably arranged in a chamber formed by the inclined walls 22 and 23 extending from the casing 13 to the end walls 24 and 25 of the display casing.

The chamber 26 has a bottom 27 extending laterally from the casing 13 and bent angularly to form a draining part 28 and an upwardly extending part 29 which is suitably secured to the rear wall 30 of the casing immediately below the manifold 8 and its spraying nozzles 9. The baffle plates, previously referred to, do not fit closely into the draining part 28 in order to permit water to flow through said parts to a drain pipe 31 (see Fig. 5) for returning water to the tank 4.

Water is supplied to the tank 4 through a filler pipe 33 in the end wall 24 of the casing; and a drain valve extends through the said end wall 24 to control the draining of water from the tank 4, the drain valve being designed by the reference numeral 34.

The top wall of the chamber 26 is formed by a continuation of the top of the casing 13, and extends toward the back of the casing to a point adjacent to the manifold 8 and the spraying nozzles 9. This top wall is then directed upwardly to form a wall 35, in front of the manifold 8, and is bent to form a substantially circular top 36 which is continued as a front wall 37 to contact with the top wall of said chamber 26, and to form, with a plate 38, a display support for vegetables and similar foodstuffs which may be placed on the plate or shelf 38.

Immediately above the circular top 36, a casing member 39 extends between and is supported by the end wall of the casing. The bottom 40 of the member 39 is formed arcuately and is spaced somewhat apart from the circular top 36 to form a wide conduit for directing air from the fan 14 through the spray formed by the spraying nozzles 9 onto the foodstuffs displayed on the shelf 38.

From the rear end of the bottom 40 the member 39 is formed as a wall 41, extending upwardly in the casing and parallel to the back wall 1 thereof. The wall 41 continues as a substantially semicircular top 42, which is extended downwardly to rest on a shelf 43 supported by the end walls of the casing, and having its rear end 44 connected to the front end of the bottom wall 40 of the member 39.

Immediately above the top 42 and secured to the back wall 30 is an arcuate deflector plate 45 which is spaced apart from the top 42 to direct moistened air from the fan 14 and the spray formed by the nozzles 9 downwardly onto the foodstuffs displayed on the shelf 43. The deflector plate 45 is supported at its front end by a shelf 46, which, in turn, is supported by the back and end walls of the casing, and has its front 47 turned down and suitably connected to the deflector plate 45.

The top of the display casing may extend horizontally out from the back wall 1; and this top 48 may be supported at the center by a brace 49 which also supports the shelf 43 at the center thereof.

The front wall 3 may have a trough-like shelf 50 secured thereto by bending over the rear end of the shelf 50 over the upper edge of the wall 3 as shown in Fig. 2; and braces 51, 52, 53 and 54 extending between the outer edge of the shelf 50 and the lower part of the front wall 3 may be suitably secured to said outer edge and lower part in order properly to support the shelf 50 and the foodstuffs carried thereby.

At the rear of the stand a plurality of doors 58 are detachably mounted immediately at the rear of the nozzles 9 in order to give access to these nozzles. The doors, as shown in Fig. 2, are mounted slidably in runways 56 and 57 to allow the doors to be moved therealong and provide access to the apertures 58 formed in the rear wall of the cabinet at the back of the nozzles 9.

It is to be understood that the motor for operating the fan and the water circulating pump are to be connected in series for simultaneous operation; and a single switch 55' may be used to start both of said motors in operation when desired.

It will be apparent from the foregoing disclosure that I have provided a vegetable display stand which can be readily moved from one store to another; and in that stand that I have provided means self-contained for moistening and directing air onto the foodstuffs displayed on that stand. The moistening apparatus does not require connection of the stand with any permanent supply of water, and the parts are so arranged that water can be readily supplied to the tank for repeated use through the filling opening provided in the end walls of the tank.

It will also be obvious that the spraying nozzles 9 form a screen of water through which the baffle plates spread and direct air from the fans 14 to be conducted through the arcuate passageways above the water spray onto the foodstuffs displayed on the shelves of the stand.

What we claim is:

Cooling display cabinet for vegetables and similar foodstuffs comprising a receptacle with superposed shelves having an air duct behind said shelves with branches extending above and toward said shelves, means for creating an air current through said air duct and branches and discharging it upon said shelves, in combination with a recurrent water circulation system including a tank below said shelves into which said shelves drain, spray nozzles in said air duct below said branches for creating a water screen in said air current, and means for forcing the water from said tank through said nozzles.

In testimony whereof we affix our signatures.

JAMES A. BIRDSONG.
JESS L. SHOWERS.